United States Patent [19]
Tamura et al.

[11] Patent Number: 5,829,418
[45] Date of Patent: Nov. 3, 1998

[54] FUEL SUPPLY SYSTEM FOR INTERNAL COMBUSTION ENGINES

[75] Inventors: Masayuki Tamura, Tokyo-to; Kazuo Takeuchi, Utsunomiya; Fumihiro Yamaguchi, Kawachi-gun; Hajime Endo, Omiya; Kenichiro Ishibashi, Utsunomiya, all of Japan

[73] Assignee: Honda Giken Kogyo Kabushiki Kaisha, Tokyo, Japan

[21] Appl. No.: 840,284

[22] Filed: Apr. 14, 1997

[30] Foreign Application Priority Data

Apr. 24, 1996 [JP] Japan .................................. 8-126342

[51] Int. Cl.⁶ ...................................... F02B 43/00
[52] U.S. Cl. .................................. 123/529; 123/198 DB
[58] Field of Search .................... 123/527, 529, 123/198 DB

[56] References Cited

U.S. PATENT DOCUMENTS

| | | | |
|---|---|---|---|
| 4,811,720 | 3/1989 | Katumata et al. ............... | 123/527 |
| 5,010,868 | 4/1991 | Clements ........................ | 123/527 |
| 5,179,922 | 1/1993 | Bartholomew .................. | 123/198 DB |
| 5,253,778 | 10/1993 | Sirosh ............................ | 220/590 |
| 5,367,999 | 11/1994 | King et al. ..................... | 123/527 |
| 5,533,492 | 7/1996 | Willey et al. ................... | 123/527 |
| 5,611,316 | 3/1997 | Oshima et al. ................. | 123/529 |
| 5,632,250 | 5/1997 | Kato et al. ..................... | 123/198 DB |

*Primary Examiner*—Erick R. Solis
*Attorney, Agent, or Firm*—Frishauf, Holtz, Goodman, Langer & Chick

[57] ABSTRACT

A fuel supply system for an internal combustion engine including a fuel tank having a resin liner. The fuel tank is constructed so as to withstand refueling of compressed gaseous fuel. Fuel filled in the fuel tank is supplied to the engine through a fuel supply passage. When the pressure within the fuel tank drops below a predetermined value, the supply of fuel to the engine is inhibited.

10 Claims, 7 Drawing Sheets

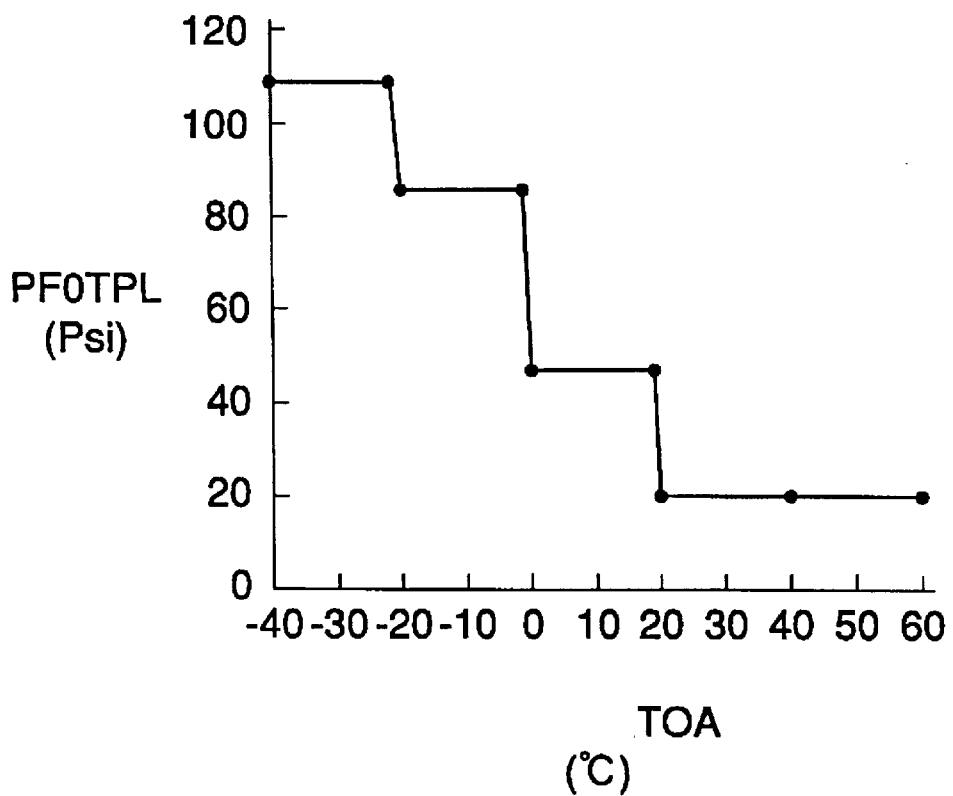

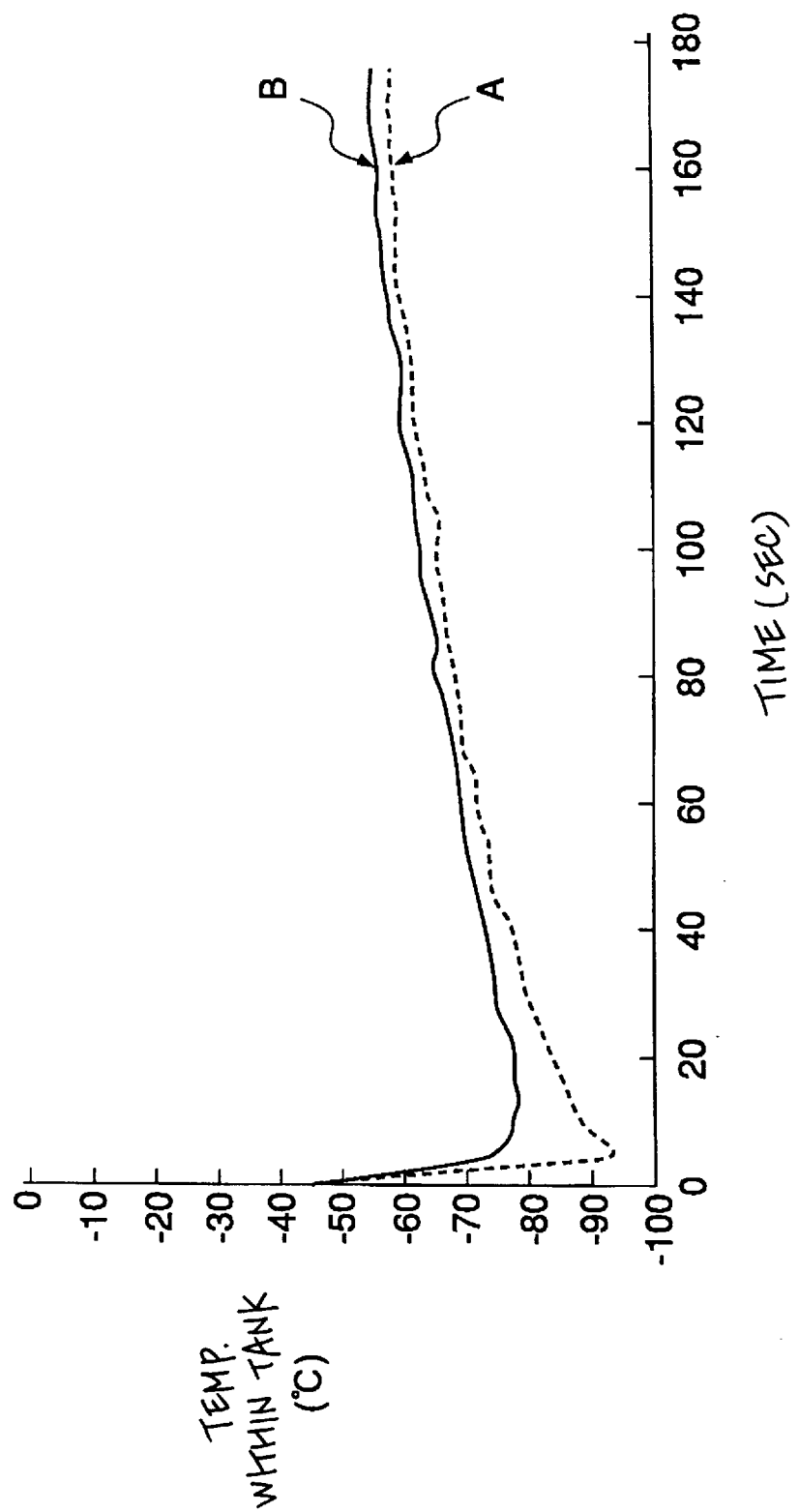

FUEL SUPPLY SYSTEM FOR INTERNAL COMBUSTION ENGINES

BACKGROUND OF THE INVENTION

1. Field of the Invention

This invention relates to a fuel supply system for internal combustion engines, which supplies fuel to the engine from a fuel tank charged with a gaseous fuel such as a compressed natural gas (CNG).

2. Prior Art

In a fuel supply system for an internal combustion engine installed in an automotive vehicle and using a gaseous fuel such as a compressed natural gas, a fuel tank of the engine is charged with the gaseous fuel or compressed gaseous fuel, and then the compressed gaseous fuel within the fuel tank is supplied in a decompressed state to the engine.

A fuel tank employed in such a fuel supply system is generally charged with a compressed fuel, and therefore it is demanded that the fuel tank should be designed to be free from leaks of fuel therefrom while maintaining sufficient mechanical strength. To satisfy such demand and secure lightness in weight and resistance to corrosion, etc. of the fuel tank, there has been proposed a fuel supply system, for example, by U.S. Pat. No. 5,253,778, in which the fuel tank has a multi-layered structure comprised of an outer or exterior shell and an inner or interior liner, both the shell and the liner being formed of non-metallic materials. For example, the outer shell is formed of a composite fiber reinforced resin material or a like material, and the inner liner is formed of a resin such as high-density polyethylene or polyamide. Particularly, by employing this resin liner, the fuel tank is free from leakage of fuel, while maintaining lightness in weight and durability.

Further, theoretically the fuel tank employed in the fuel supply system can supply fuel to the engine until the pressure within the fuel tank decreases to a value at and below which fuel injection cannot be effected (e.g. the atmospheric pressure). In many cases, therefore, fuel is recharged into the fuel tank after the pressure within the fuel tank has decreased to such a value that the fuel supply to the engine can be no longer carried out.

The conventional fuel supply system, however, does not contemplate the outside air temperature in refueling the fuel tank, which can provide an inconvenience especially when refueling is carried out at a low temperature.

More specifically, at refueling, when gaseous fuel under high pressure (e.g. 250 kgf/cm$^2$ (24.5 Mpa)) is instantaneously recharged into the empty fuel tank which is under relatively low pressure, the fuel expands at once within the fuel tank, leading to a drastic drop in the temperature within the fuel tank. When the refueling is carried out at a very low outside air temperature (e.g. −40° C. or less, as may occur in North America), the temperature within the fuel tank can drop immediately after the refueling, to an extremely low value (e.g. −90° C.) which is much lower than the outside air temperature. If the temperature within the fuel tank drops to such an extremely low value, the inner resin liner of the fuel tank tends to embrittle and become degraded in durability. Besides at such low temperatures, the seals of the fuel tank have degraded fluid impermeability.

SUMMARY OF THE INVENTION

It is the object of the invention to provide a fuel supply system for internal combustion engines, which is capable of preventing degradation in the durability of an inner liner of the fuel tank due to charging of fuel into the fuel tank at a low outside air temperature.

To attain the above object, the present invention provides a fuel supply system for an internal combustion engine including a fuel tank having a resin liner, the fuel tank being constructed so as to withstand refueling of compressed gaseous fuel, the system comprising:

supply means for supplying fuel filled in the fuel tank to the engine; and inhibiting means operable when pressure within the fuel tank drops below a predetermined value, for inhibiting the supply of fuel to the engine by the supply means.

Preferably, the predetermined value of pressure within the fuel tank is higher than a value of the pressure within the fuel tank assumed when a residual amount of fuel within the fuel tank is equal to 0.

More preferably, the predetermined value of pressure within the fuel tank is set according to outside air temperature.

Alternatively, the predetermined value of pressure within the fuel tank is set according to temperature of intake air supplied to the engine.

Preferably, the predetermined value of pressure is set to a larger value as the outside air temperature is lower.

Preferably, the fuel supply system includes a compressed fuel supply passage extending from the fuel tank, and a pressure sensor for detecting pressure of the compressed fuel in the compressed fuel supply passage, the pressure within the fuel tank being the pressure of the compressed fuel in the compressed fuel supply passage detected by the pressure sensor.

Advantageously, the fuel supply system includes a compressed fuel supply passage extending from the fuel tank, a pressure sensor for detecting pressure of the compressed fuel in the compressed fuel supply passage, a first temperature sensor for detecting temperature of the compressed fuel in the compressed fuel supply passage, and a second temperature sensor for detecting temperature within the fuel tank, the pressure within the fuel tank being calculated based on the pressure of the compressed fuel in the compressed fuel supply passage, the temperature of the compressed fuel in the compressed fuel supply passage detected by the first temperature sensor, and the temperature within the fuel tank detected by the second temperature sensor.

Preferably, the fuel supply system includes a fuel supply passage communicating with the fuel tank, for supplying the fuel filled in the fuel tank, and the inhibiting means comprises an electromagnetic valve disposed to close the fuel supply passage.

More preferably, the electromagnetic valve is provided inside the fuel tank.

Alternatively, the electromagnetic valve is provided separately from the fuel tank.

Advantageously, the fuel supply system includes warning means for issuing a warning when the pressure within the fuel tank becomes equal to a second predetermined value larger than the predetermined value.

Typically, the compressed gaseous fuel is a natural gas.

In a preferred embodiment of the invention, the fuel supply system comprises:

supply means for supplying fuel filled in the fuel tank to the engine; and inhibiting means operable when a residual amount of fuel within the fuel tank decreases below a predetermined value dependent upon outside air temperature, for inhibiting the supply of fuel to the engine by the supply means.

The above and other objects, features, and advantages of the invention will be more apparent from the following detailed description taken in conjunction with the accompanying drawings.

BRIEF DESCRIPTION OF THE DRAWINGS

FIG. 6 shows a table for determining a minimum pressure PF0TPL, which is employed in the FIG. 5 program; and FIG. 7 is a graph showing changes in the temperature within the fuel tank immediately after charging of fuel, with the lapse of time.

DETAILED DESCRIPTION

The invention will now be described in detail with reference to the drawings showing an embodiment thereof.

Figure 1:
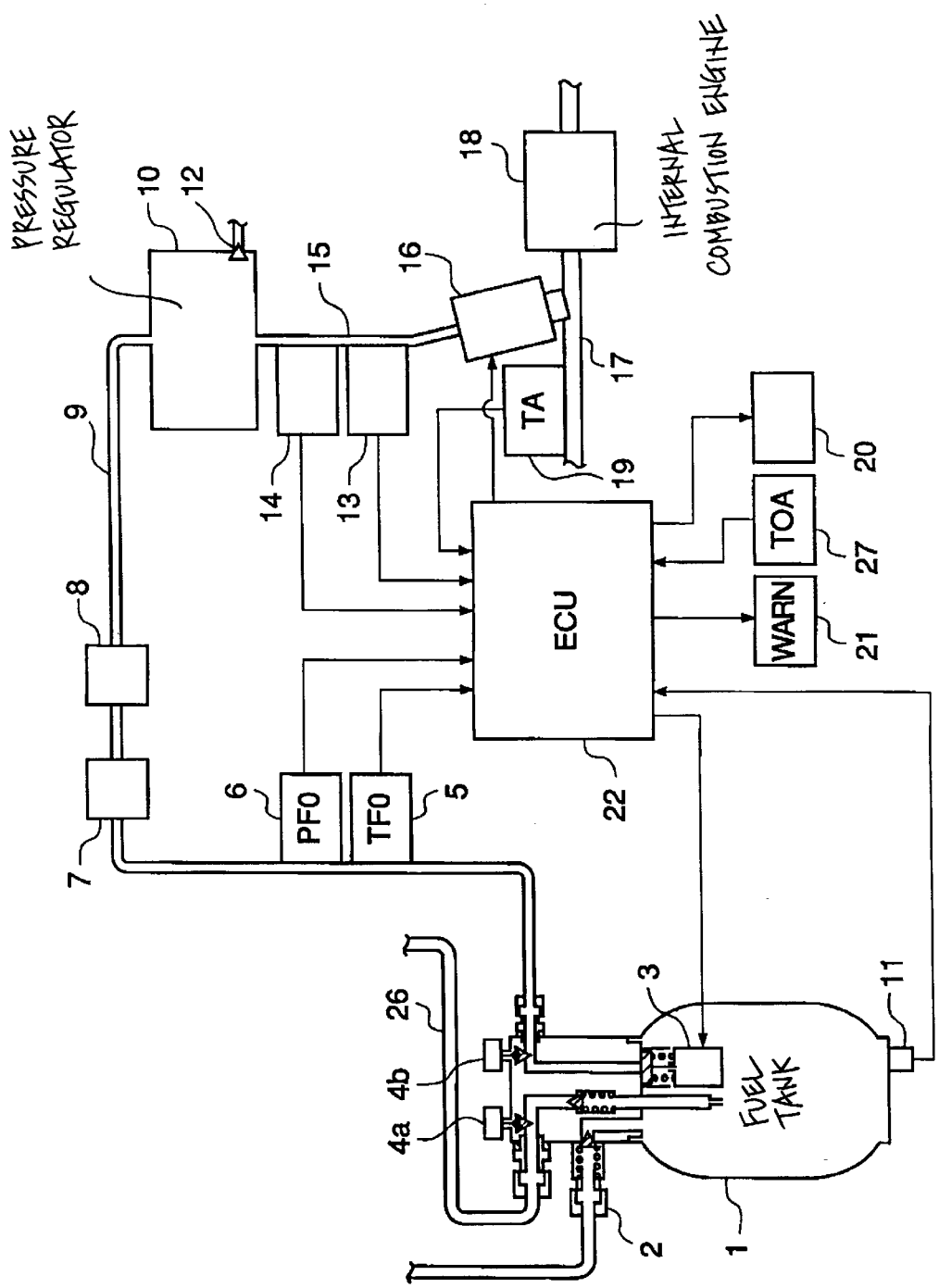
FIG. 1 is a block diagram schematically showing the whole arrangement of an internal combustion engine and a fuel supply system therefor, according to an embodiment of the invention.

Referring first to FIG. 1, there is illustrated the whole arrangement of an internal combustion engine and a fuel supply system therefor, according to an embodiment of the invention.

In the figure, reference numeral 18 designates an internal combustion engine (hereinafter simply referred to as "the engine") having four cylinders, not shown, for instance, which is installed in an automotive vehicle driven by power generated by combustion of a compressed natural gas in the cylinders of the engine 18.

A fuel tank 1 of the engine is constructed so as to store under high pressure a compressible fuel, the most part of which is in a gaseous phase, such as a compressed natural gas (CNG) (hereinafter referred to as "fuel"). Connected to the fuel tank 1 are a compressed fuel-charging passage 26 through which a compressed natural gas under high pressure, e.g. at 250 kgf/cm$^2$ (24.5 Mpa) is charged into the fuel tank 1 by an external charging device, not shown, a compressed fuel supply passage 9 through which the compressed fuel within the fuel tank 1 is supplied to the engine 18, and a tank relief valve 2 as a safety valve formed by a one-way valve. The compressed fuel-charging passage 26 and the compressed fuel supply passage 9 have manual locking valves 4a and 4b arranged therein, respectively, for interrupting outflow and inflow of the compressed fuel from and into the fuel tank 1, respectively.

Further, the fuel tank 1 is constructed so as to withstand repeated refueling. At refueling of compressed fuel, the manual locking valve 4a is manually opened to allow compressed fuel to be charged into the fuel tank 1 from the external charging device, through the compressed fuel-charging passage 26. When the pressure within the fuel tank 1 exceeds a predetermined upper limit value, the tank relief valve 2 opens to allow part of the fuel to be discharged from the fuel tank 1 to the outside.

An internal tank solenoid valve 3 is provided in the fuel tank 1 at an end of the compressed fuel supply passage 9 opening into the fuel tank 1. The internal tank solenoid valve 3 is electrically connected to an electronic control unit (hereinafter referred to as "the ECU") 22 for engine control to have its valving operation controlled by a signal from the ECU 22, to thereby control supply and interruption of compressed fuel within the fuel tank 1 to the compressed fuel supply passage 9.

A tank temperature sensor 11 is inserted into the fuel tank 1 at a bottom portion thereof, for supplying a signal indicative of the sensed temperature within the fuel tank 1 to the ECU 22.

The compressed fuel supply passage 9 extends to a pressure regulator 10, to lead compressed fuel discharged from the fuel tank 1 to the pressure regulator 10. Arranged in or across the compressed fuel supply passage 9 are a compressed fuel temperature sensor 5, a compressed fuel pressure sensor 6, a manual shutoff valve 7, and a filter 8. The compressed fuel temperature sensor 5 detects the temperature of compressed fuel in the compressed fuel supply passage 9 (hereinafter referred to as "the compressed fuel temperature TF0"), and supplies a signal indicative of the sensed temperature to the ECU 22. The compressed fuel pressure sensor 6 detects the pressure of compressed fuel in the compressed fuel supply passage 9 (hereinafter referred to as "the compressed fuel pressure PF0"), and supplies a signal indicative of the sensed pressure to the ECU 22. The supply of compressed fuel can be interrupted by manually operating the manual shutoff valve 7. The filter 8 filters the compressed fuel supplied from the fuel tank 1.

The pressure regulator 10 decompresses the compressed fuel into fuel under a constant pressure value (e.g. 0.25 Mpa) suitable for injection. The pressure regulator 10 is provided with a relief valve 12 as a safety valve for preventing the pressure of fuel after the decompression from exceeding a predetermined upper limit value. Connected to the pressure regulator 10 via an injection fuel supply passage 15 are fuel injection valves 16, only one of which is shown, so that the decompressed fuel under the constant pressure value from the pressure regulator 10 is supplied to the fuel injection valve 16.

Arranged in the injection fuel supply passage 15 are an injection fuel temperature sensor 13 and an injection fuel pressure sensor 14. The injection fuel temperature sensor 13 detects the temperature of fuel in the passage 15, and supplies a signal indicative of the sensed temperature to the ECU 22. The injection fuel pressure sensor 14 detects the pressure of fuel in the passage 15, and supplies a signal indicative of the sensed temperature to the ECU 22.

The fuel injection valves 16 are each provided for each cylinder of the engine 18 and inserted into the interior of an intake pipe 17 of the engine at a location slightly upstream of the cylinder block of the engine 22. The fuel injection valves 16 are electrically connected to the ECU 22 to have their valve opening periods controlled by signals therefrom. An intake air temperature sensor 19 is inserted into the intake pipe 17 at a location upstream of the fuel injection valves 16. The intake air temperature sensor 19 detects the temperature of intake air in the intake pipe 17 (hereinafter referred to as "the intake air temperature TA"), and supplies a signal indicative of the sensed intake air temperature TA to the ECU 22.

An outside air temperature sensor 27 is arranged in the vehicle at a predetermined location (e.g. in a space in which the fuel tank is accommodated, or at a front bumper), for detecting the temperature of outside or fresh air and supplying a signal indicative of the sensed outside air temperature TOA to the ECU 22.

Further connected to the ECU 22 are a fuel level gauge 20 for displaying an amount of fuel remaining in the fuel tank 1, and a warning lamp 21 for alerting the driver with various kinds of warnings. The ECU 22 imposes a predetermined limitation on the supply of compressed fuel from the fuel tank 1 at a low outside air temperature, and issues a necessary warning to be indicated by the warning lamp 21.

The ECU 22 is comprised of an input circuit having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU"), a memory circuit storing operational programs executed by the CPU, maps and tables, and for storing results of calculations therefrom, etc., and an output circuit which outputs driving signals to the internal tank solenoid valve 3 and the fuel injection valves 16.

Figure 2:
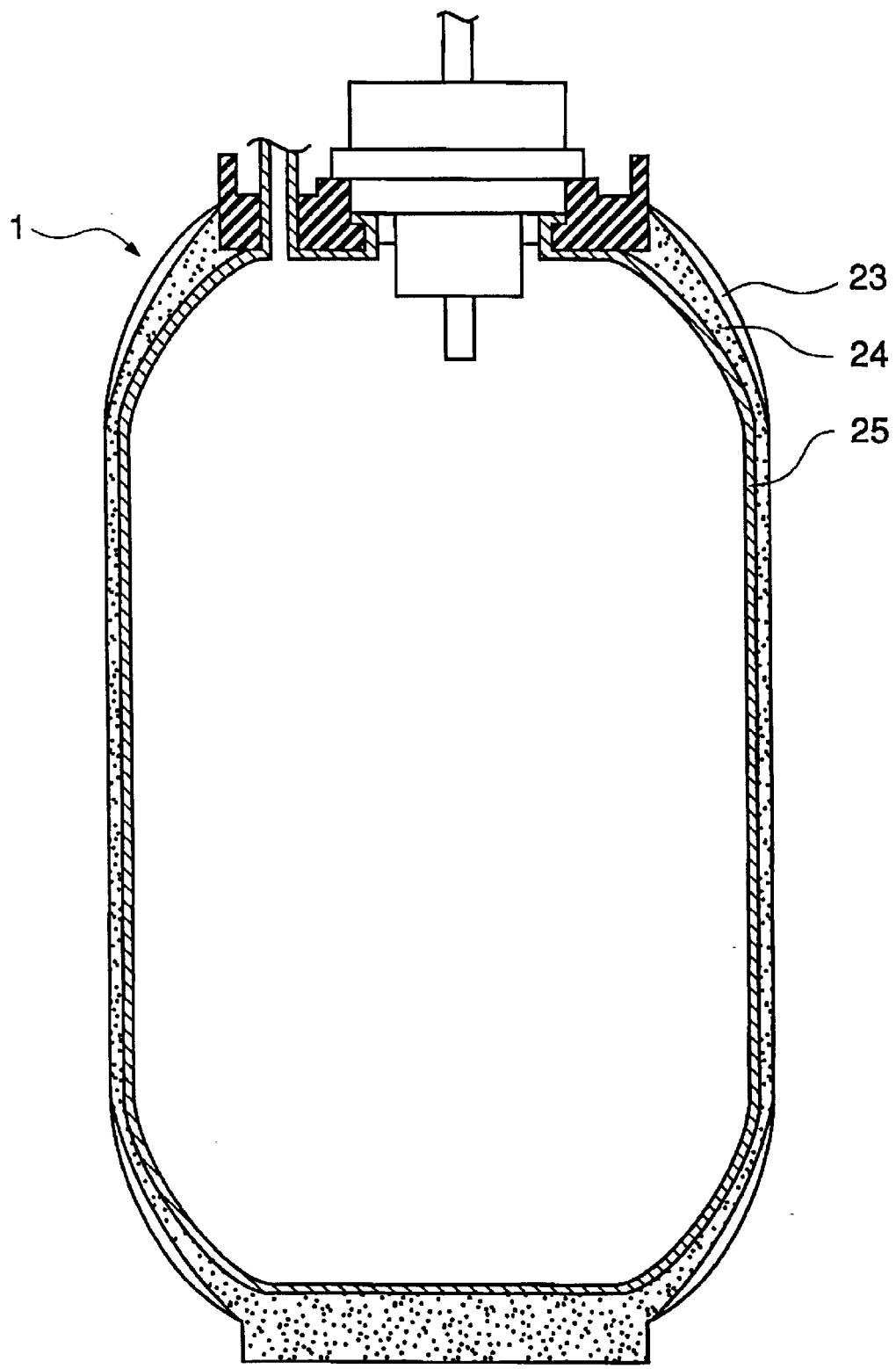
FIG. 2 is a longitudinal sectional view of a fuel tank appearing in FIG. 1.

FIG. 2 shows in longitudinal section the interior construction of the fuel tank 1.

The fuel tank 1 has a multi-layered wall structure comprised of a dome-shaped protective layer 23 as an outer layer, a shell 24 as an intermediate layer, and a liner 25 as an inner layer. Each layer is formed of a non-metallic material to make the fuel tank 1 lighter in weight and corrosion-resistant. Preferably, as the non-metallic material, suitable materials have been selected to obtain required strength and fluid impermeability of the fuel tank 1. For example, a fiber-reinforced resin (G-FRP) is employed for the dome-shaped protective layer 23 to secure required shock resistance, a composite carbon fiber for the shell 24 to maintain required strength, and high density polyethylene for the liner 25 to maintain required impermeability against fluid such as the compressed natural gas.

Figure 3:
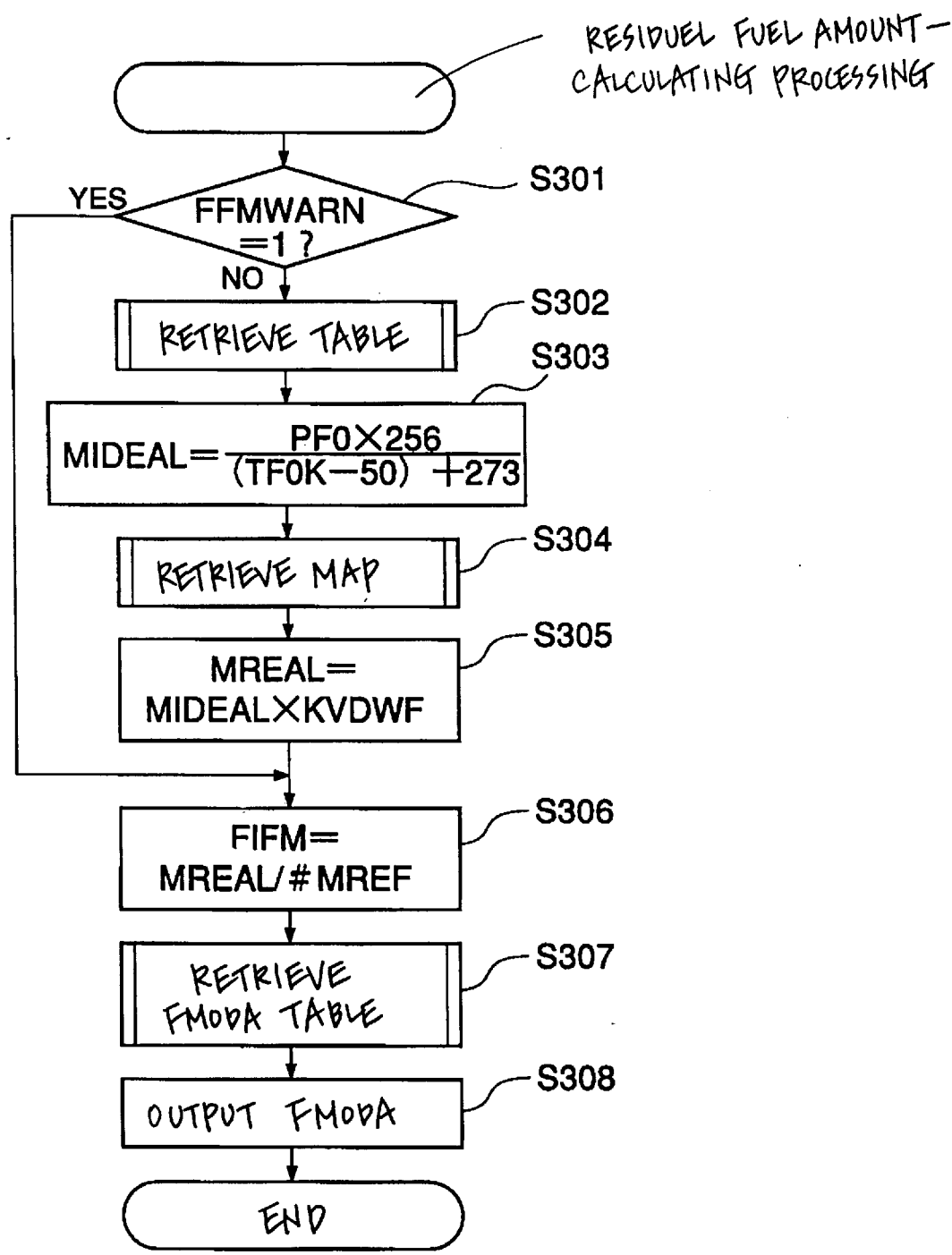
FIG. 3 is a flowchart showing a program for carrying out processing for calculating a residual fuel amount in the fuel tank.

FIG. 3 shows a program for carrying out residual fuel amount-calculating processing according to the present embodiment. The present processing is executed by the CPU of the ECU 22, e.g. as background processing.

First, at a step S301, it is determined whether or not a failure detection flag FFMWARN is set to "1". The failure detection flag FFMWARN, when set to "1", indicates that the compressed fuel temperature sensor 5 or the compressed fuel pressure sensor 6 is faulty. The failure detection flag FFMWARN is set according to residual fuel amount-warning processing, not shown, for turning on the warning light 21 when the residual fuel amount is small, in a manner depending on the residual fuel amount.

If it is determined at the step S301 that the failure detection flag FFMWARN is not set to "1", the program proceeds to a step S302, wherein a table, not shown, is retrieved to determine a fuel temperature linearized value TF0K which is obtained by linearizing a sensor output value of the compressed fuel temperature TF0 supplied to the ECU 22.

At the following step S303, a residual fuel amount MIDEAL within the fuel tank 1 is calculated by the use of the following equation (1):

$$\text{MIDEAL} = (\text{PF0} \times 256)/((\text{TF0K} - 50) + 273) \tag{1}$$

At the following step S304, a mol conversion coefficient KVDWF for converting the residual fuel amount MIDEAL in terms of an ideal gas into the number of mols of a real gas is determined from a map, not shown, which is set according to the compressed fuel pressure PF0 and the compressed fuel temperature TF0. The mol conversion coefficient KVDWF is set, e.g. to 0.7 to 2.0.

At the following step S305, the residual fuel amount MIDEAL is multiplied by the mol conversion coefficient KVDWF, to thereby calculate the number of mols MREAL. Then, at a step S306, the number of mols MREAL is divided by a ratio conversion coefficient #MREF, to thereby calculate a residual fuel amount ratio FIFM. The ratio conversion coefficient #MREF represents the number of mols of fuel to be contained in the fuel tank 1 when the fuel tank 1 is fully charged and is set to a predetermined value inherent to the fuel tank 1. The more the ratio conversion coefficient #MREF, the less the residual fuel amount ratio FIFM.

Figure 4:
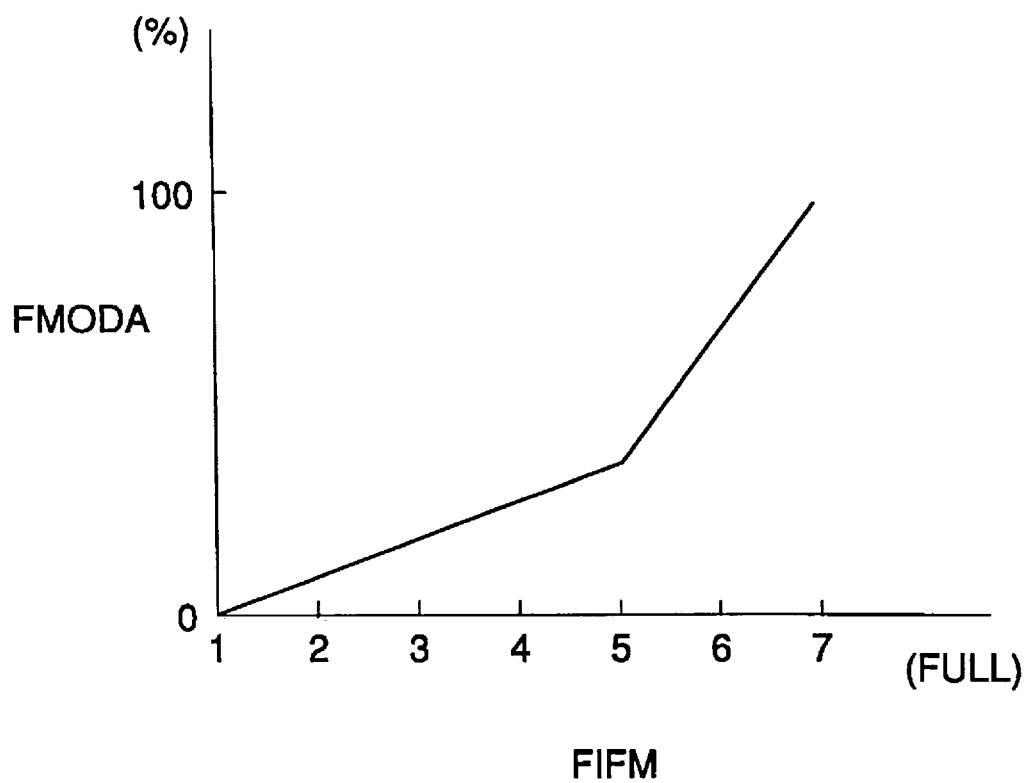
FIG. 4 shows a table for determining a residual fuel amount output value FMODA, which is employed in the FIG. 3 program.

At the following step S307, a residual fuel amount output value FMODA is determined from an FMODA table which is set according to the residual fuel amount ratio FIFM. The FMODA table is shown in FIG. 4 in which the abscissa represents the residual fuel amount ratio FIFM, and the ordinate the residual fuel amount output value FMODA. As shown in the figure, the FMODA table is set such that the residual fuel amount output value FMODA is set to a larger value as the residual fuel amount ratio FIFM is larger, and this tendency is accentuated when the residual fuel amount ratio FIFM exceeds 5.

At the following step S308, the thus obtained residual fuel amount output value FMODA is delivered to the fuel level gauge 20 and displayed thereby as the residual fuel amount, followed by terminating the present routine.

On the other hand, if it is determined at the step S301 that the failure detection flag FFMWARN is set to "1", the residual fuel amount cannot be correctly calculated, and therefore the program jumps to the step S306 et seq.

According to the present residual fuel amount-calculating processing, the residual fuel amount within the fuel tank 1 can be calculated based on the compressed fuel pressure PF0 and the compressed fuel temperature TF0, and the thus calculated residual fuel amount can be displayed by the fuel level gauge 20. Further, by executing the mol conversion, the residual fuel amount can be accurately calculated, which reflects the influence of the pressure and temperature of the fuel.

Figure 5:
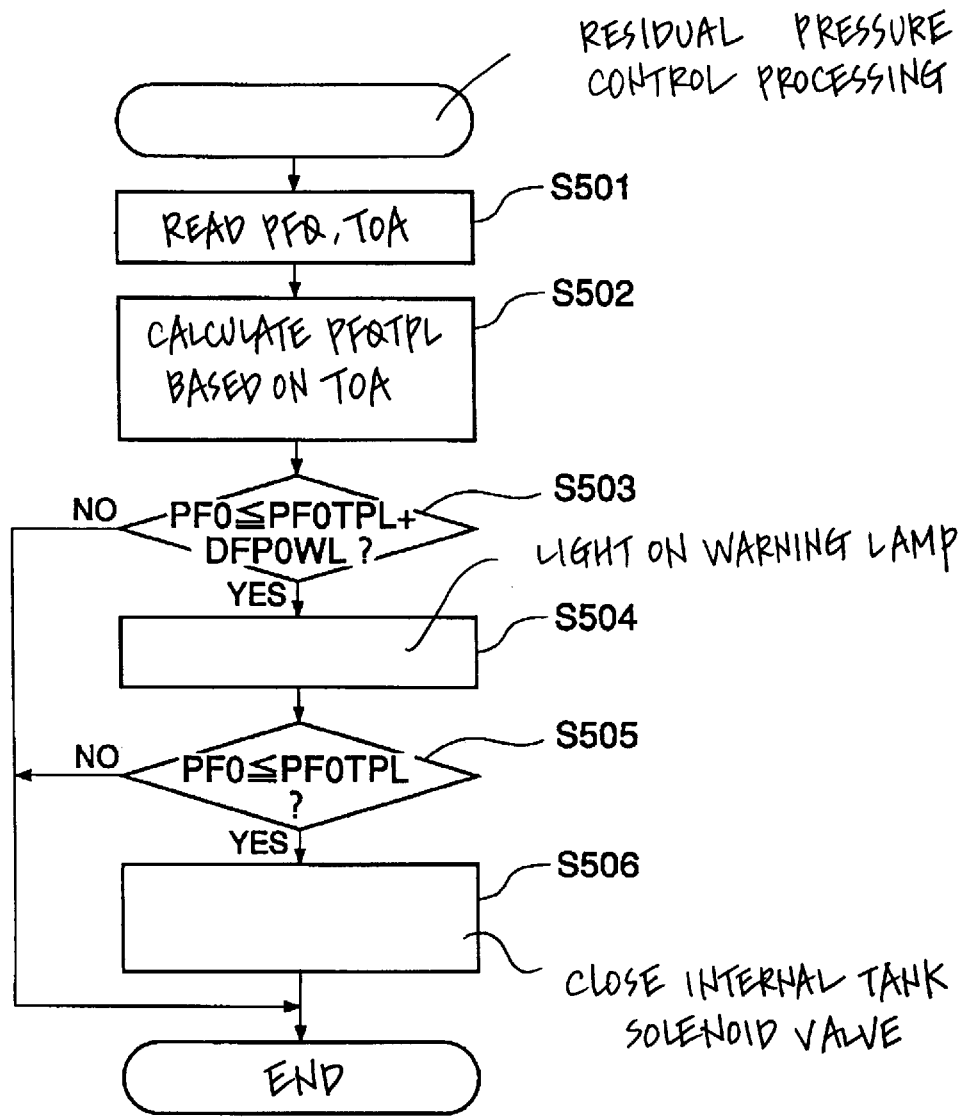
FIG. 5 is a flowchart showing a program for carrying out processing for controlling residual pressure within the fuel tank.

FIG. 5 shows a program for carrying out residual pressure control processing by the fuel supply system of the present embodiment. This processing is executed by the CPU of the ECU 22 as background processing.

First, at a step S501, the compressed fuel pressure PF0 and the outside air temperature TOA are read out from the memory circuit of the ECU 22. Then, at a step S502, a minimum pressure PF0TPL to be kept in the fuel tank 1 for protecting the fuel tank 1 is determined by using a minimum pressure table, shown in FIG. 6, which is set according to the outside air temperature TOA. The minimum pressure-determining table is stored in a memory, not shown, of the ECU 22, which is set such that the minimum pressure PF0TPL is stepwise set to a larger value as the outside air temperature TOA is lower. For example, when the outside air temperature TOA is lower than −20° C., the minimum pressure PF0TPL is set to 110 PSi (759 Pa).

Then, it is determined at a step S503 whether or not the following inequality (2) holds:

$$\text{PF0} \leq \text{PF0TPL} + \text{DFP0WL} \tag{2}$$

where DFP0WL represents an addend which is provided for issuing a warning before the compressed fuel pressure PF0 actually drops below the minimum pressure PF0TPL.

If it is determined at the step S503 that the above inequality (2) does not hold, the program is immediately terminated. On the other hand, if the inequality (2) holds, the warning lamp 21 is lit on at a step S504, and then it is determined at a step S505 whether or not PF0≦PF0TPL holds. If PF0≦PF0TPL does not hold, the program is immediately terminated, whereas if PF0≦PF0TPL holds, the internal tank solenoid valve 3 is closed at a step S506, followed by terminating the present routine.

According to the residual pressure control processing described above, when the compressed fuel pressure PF0 is equal to or below the minimum pressure PF0TPL, the internal tank solenoid valve 3 is closed, and therefore the next charging of fuel can be carried out with the constant pressure remaining within the fuel tank 1. As a result, a drastic drop in the temperature within the fuel tank 1 upon recharging of fuel at a low outside air temperature can be avoided, which can prevent embrittlement of the inner resin liner 25 of the fuel tank 1 and hence prevent degradation in the durability of the fuel tank 1. Further, required fluid impermeability of seals of the fuel tank can be secured.

Further, the constant pressure is always secured within the fuel tank 1, which prevents the liner 25 from inwardly bending. As a result, the durability of the fuel tank 1 can be further improved.

Still further, the minimum pressure PF0TPL is set according to the outside air temperature TOA, and therefore unnecessary fuel supply interruption at a non-low outside air temperature can be prevented while avoiding degradation of the durability of the fuel tank 1.

Moreover, a warning is issued when the compressed fuel pressure PF0 drops to or below the value obtained by adding the addend DFPOWL to the minimum pressure PF0TPL, which enables informing the driver that the pressure is scarcely left, before the interruption of the fuel supply.

FIG. 7 shows changes in the temperature within the fuel tank 1 assumed immediately after charging of fuel into the fuel tank, with the lapse of time, according to the fuel supply system of the present embodiment as well as the conventional fuel supply system. In the figure, the abscissa represents the time, and the ordinate the temperature within the fuel tank 1. In the figure, the broken line A indicates a change in the temperature within the fuel tank when fuel is recharged after the pressure within the fuel tank 1 has decreased below the minimum pressure to zero, according to the conventional fuel supply system. On the other hand, the solid line B indicates a change in the temperature within the fuel tank when fuel is recharged with the minimum pressure left within the fuel tank. The time point at which refueling is started is set to 0 seconds.

Provided that the temperature within the fuel tank 1 is equal to the outside air temperature (−45° C.), when the fuel tank 1 is charged with fuel, the temperature within the fuel tank 1 sharply drops to nearly −95° C. after the lapse of approximately 5 seconds from the start of the charging, according to the conventional system, as indicated by the solid line A. On the other hand, according to the present embodiment, as indicated by the solid line B, when the fuel tank 1 is charged with fuel under the same conditions as mentioned above, the temperature within the fuel tank 1 drops to a minimal value after the lapse of 10 to 15 seconds from the start of the charging, which, however, can be −75° to −80° C. at most. As a result, the above mentioned effects can be achieved by virtue of the reduced drop in the temperature.

According to the present embodiment, the compressed fuel pressure PF0 detected by the compressed fuel pressure sensor 6 is directly set to a value of the pressure within the fuel tank 1, but this is not limitative. Alternatively, the pressure within the fuel tank 1 may be calculated based on the compressed fuel pressure PF0, the compressed fuel temperature TF0, and the output value from the tank temperature sensor 11. By this calculation, a more accurate pressure value within the fuel tank 1 can be obtained, to thereby improve the accuracy of the residual pressure control processing.

Further, according to the present embodiment, the pressure within the fuel tank is employed for executing the residual pressure control processing, but this is not limitative. Alternatively, the residual fuel amount within the fuel tank 1 may be employed therefor. For example, the residual fuel amount output value FMODA calculated by the residual fuel amount-calculating processing of FIG. 3 may be employed, such that it is compared with a predetermined residual fuel amount which is set according to the outside air temperature, as a threshold value for controlling the closure of the internal tank solenoid valve 3. As a result, substantially the same effects as those obtained by the employment of the pressure can be achieved.

According to the residual pressure control processing of the present embodiment, the internal tank solenoid valve 3 is closed, but this is not limitative. Alternatively, other methods may be employed, insofar as they can block a further outflow of fuel from the fuel tank 1, such as interruption of fuel supply by means of an electromagnetic valve provided separately from the fuel tank, manual interruption of fuel supply, based on a residual fuel amount warning, engine stoppage by other means.

Further, although in the present embodiment the minimum pressure PF0TPL employed in the residual pressure control processing is calculated based on the outside air temperature TOA detected by the outside air temperature sensor 27, alternatively the intake air temperature TA detected by the intake air sensor 19 may be employed as a temperature representing the outside air temperature.

Also alternatively, the minimum pressure PF0TPL as the tank protective minimum pressure may be calculated as a function of the outside air temperature TOA.

Although according to the present embodiment, a compressed natural gas is employed as fuel, other kinds of fuel which can be compressed and filled into the fuel tank may be employed.

What is claimed is:

1. A fuel supply system for an internal combustion engine including a fuel tank having a resin liner, said fuel tank being constructed so as to withstand refueling of compressed gaseous fuel, the system comprising:

supply means for supplying fuel filled in said fuel tank to said engine; and inhibiting means operable when a pressure within said fuel tank drops below a predetermined value for inhibiting the supply of fuel to said engine by said supply means;

wherein said predetermined value of pressure within said fuel tank is higher than a value of a pressure within said fuel tank assumed when a residual amount of fuel within said fuel tank is equal to 0, and said predetermined value of pressure within said fuel tank is set according to at least one of an outside air temperature and a temperature of intake air supplied to said engine.

2. A fuel supply system as claimed in claim 1, wherein said predetermined value of pressure is set to a larger value as said outside air temperature becomes lower.

3. A fuel supply system as claimed in claim 1, including a compressed fuel supply passage extending from said fuel tank, and a pressure sensor for detecting a pressure of said compressed fuel in said compressed fuel supply passage, said pressure within said fuel tank being said pressure of said compressed fuel in said compressed fuel supply passage detected by said pressure sensor.

4. A fuel supply system as claimed in claim 1, including a fuel supply passage communicating with said fuel tank, for supplying said fuel filled in said fuel tank, and wherein said inhibiting means comprises an electromagnetic valve disposed to close said fuel supply passage when the pressure within said fuel tank drops below the predetermined value.

5. A fuel supply system as claimed in claim 4, wherein said electromagnetic valve is provided inside said fuel tank.

6. A fuel supply system as claimed in claim 4, wherein said electromagnetic valve is provided separately from said fuel tank.

7. A fuel supply system as claimed in claim 1, including warning means for issuing a warning when said pressure within said fuel tank becomes equal to a given value larger than said predetermined value.

8. A fuel supply system as claimed in claim 1, wherein said compressed gaseous fuel comprises a natural gas.

9. A fuel supply system for an internal combustion engine including a fuel tank having a resin liner, said fuel tank being constructed so as to withstand refueling of compressed gaseous fuel, the system comprising:

supply means for supplying fuel filled in said fuel tank to said engine;

inhibiting means operable when a residual amount of fuel within said fuel tank decreases below a predetermined value dependent upon outside air temperature for inhibiting the supply of fuel to said engine by said supply means.

10. A fuel supply system for an internal combustion engine including a fuel tank having a resin liner, said fuel tank being constructed so as to withstand refueling of compressed gaseous fuel, the system comprising:

a compressed fuel supply passage extending from said fuel tank for supplying fuel filled in said fuel tank to said engine;

a pressure sensor for detecting a pressure of said compressed fuel in said compressed fuel supply passage;

a first temperature sensor for detecting a temperature of said compressed fuel in said compressed fuel supply passage;

a second temperature sensor for detecting a temperature within said fuel tank; and inhibiting means operable when a pressure within said fuel tank drops below a predetermined value for inhibiting the supply of fuel to said engine by said compressed fuel supply passage;

wherein said pressure within said fuel tank is calculated based on said pressure of said compressed fuel in said compressed fuel supply passage, said temperature of said compressed fuel in said compressed fuel supply passage detected by said first temperature sensor, and said temperature within said fuel tank detected by said second temperature sensor.

* * * * *